United States Patent
Obrecht et al.

(10) Patent No.: US 6,632,888 B2
(45) Date of Patent: Oct. 14, 2003

(54) ISOCYANATOSILANE-AND GEL-CONTAINING RUBBER MIXTURES

(75) Inventors: Werner Obrecht, Moers (DE); Martin Mezger, Burscheid (DE); Anthony Sumner, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/923,013

(22) Filed: Aug. 3, 2001

(65) Prior Publication Data

US 2002/0049282 A1 Apr. 25, 2002

(30) Foreign Application Priority Data

Aug. 8, 2000 (DE) .......................................... 100 38 488

(51) Int. Cl.⁷ .............................. C08L 7/00; C08L 9/00; C08L 11/00
(52) U.S. Cl. ....................... 525/215; 524/519; 524/525; 524/526; 525/194; 525/231; 525/232; 525/234; 525/236; 525/237; 525/342
(58) Field of Search ................................. 525/194, 342, 525/215, 231, 232, 234, 236, 237; 524/519, 525, 526

(56) References Cited

U.S. PATENT DOCUMENTS

| | | | |
|---|---|---|---|
| 2,187,146 A | 1/1940 | Calcott et al. .................. 18/57 |
| 3,842,111 A | 10/1974 | Meyer-Simon et al. .. 260/448.2 E |
| 3,873,489 A | 3/1975 | Thurn et al. ......... 260/33.6 AQ |
| 4,031,120 A * | 6/1977 | Gervase ...................... 428/420 |
| 4,709,065 A | 11/1987 | Yoshioka et al. ............ 556/428 |
| 5,110,969 A | 5/1992 | Dittrich et al. .............. 556/427 |
| 5,124,408 A | 6/1992 | Engels et al. ................ 525/215 |
| 5,227,425 A | 7/1993 | Rauline ....................... 524/493 |
| 5,363,994 A * | 11/1994 | Angeline ................ 106/287.11 |
| 5,395,891 A | 3/1995 | Obrecht et al. .............. 525/194 |
| 5,753,732 A | 5/1998 | Wideman et al. ........... 524/263 |
| 5,811,479 A | 9/1998 | Labauze ...................... 524/188 |
| 5,922,802 A * | 7/1999 | Setiabudi ..................... 524/482 |
| 6,184,296 B1 | 2/2001 | Obrecht et al. .............. 525/232 |
| 6,221,950 B1 | 4/2001 | Heinrich et al. ............. 524/492 |

FOREIGN PATENT DOCUMENTS

| | | | |
|---|---|---|---|
| CA | 2312171 | 12/2000 | |
| DE | 197 01 487 | 7/1998 | |
| JP | 62290781 A * | 12/1987 | .................. 525/100 |

OTHER PUBLICATIONS

Yokohama Rubber Co. LTD: "WPI World Patent Information Derwent, Derwent, GB", WPI World Patent Information Derwent, Derwent, GB, vol. 1993, NR. 12 XP002164474 Seite 1.

O. Bayer, Angewandte Chemie (Applied Chemistry) A 59, No.9, Sep. 1947, pp. 257–288 Das Di–Isocyanat–Polyadditionsverfahren (Polyurethane).

* cited by examiner

Primary Examiner—Judy M. Reddick
(74) Attorney, Agent, or Firm—Joseph C. Gil; Jennifer R. Seng

(57) ABSTRACT

The invention relates to rubber mixtures which contain microgels and isocyanatosilanes and vulcanisates produced therefrom. By adding isocyanatosilanes the mechanical properties of the vulcanisates, in particular the elongation properties and the abrasion resistance, are improved without the difference in rebound resilience at 70° C. and 23° C. being reduced.

8 Claims, No Drawings

ISOCYANATOSILANE-AND GEL-CONTAINING RUBBER MIXTURES

FIELD OF THE INVENTION

The invention relates to rubber mixtures which contain microgels and isocyanatosilanes and to vulcanisates produced therefrom. By adding isocyanatosilanes the mechanical properties of the vulcanisates, in particular the elongation properties and the abrasion resistance, are improved without the difference in rebound resilience at 70° C. and 23° C. being reduced.

BACKGROUND OF THE INVENTION

Use of crosslinked rubber particles in rubber compounds is described inter alia in the following patent specifications and patent applications: U.S. Ser. No. 5,124,408 (sulphur-modified CR gels), U.S. Ser. No. 5,395,891 (BR gels), DE-A 19 726 729 (SBR gels) and DE patent application 19 701 487.9 (NBR gels). In these publications the complete or partial substitution of carbon black or other inorganic fillers, such as silica, by polymeric fillers based on rubber gels is described. The vulcanisates produced therefrom are particularly suitable for producing rubber articles and tire components, such as tire treads. In particular vulcanisates with rubber gels based on CR—, SBR—, and NBR-microgels exhibit high rebound resilience and therefore a low degree of rolling resistance at 70° C. and a low rebound resistance and therefore a high skid resistance in the wet at 23° C. The difference in rebound resilience between 70° C. and 23° C. is characteristic of rubber compounds which contain these microgels. However, the mechanical properties of the microgel-containing vulcanisates are not sufficient for use in industrial rubber articles and in tire components. There are deficits in particular in the level of mechanical vulcanisate properties. There is therefore the need to improve the modulus at 300% elongation and elongation at break and the abrasion resistance.

Production and use of sulphur-containing organosilicon compounds is described inter alia in the following patent publications: DE-A 2 141 159, U.S. Ser. No. 3,873,489, U.S. Ser. No. 5,110,969, U.S. Ser. No. 4,709,065 and U.S. Ser. No. 5,227,425. The positive influence of sulphur-containing organosilicon compounds on the mechanical properties of silica-filled vulcanisates is described in these publications. However, neither the use of sulphur-containing organosilicon compounds in combination with mixtures which contain rubber particles, nor the use of sulphur-free organosilanes in combination with rubber mixtures is taught. The use of isocyanatosilanes to improve the mechanical properties of rubber compounds which contain crosslinked rubber particles is not taught either.

The use of diisocyanates for vulcanisation with natural rubber is also described in O. Bayer, Angewandte Chemie [Applied Chemistry], edition A, year 59, No. 9, p. 257–288, September 1947. The mechanical properties of the vulcanisates obtained are, however, unsatisfactory. Furthermore, the vulcanisates adhere very strongly to the metal parts of the vulcanising moulds. Use of isocyanatosilanes for vulcanisation of rubber compounds which contain rubber gels as fillers is not taught by O. Bayer.

The object was therefore to improve the mechanical value (product of modulus at 300% elongation and elongation at break) and the abrasion resistance (DIN abrasion) of microgel-containing rubber vulcanisates without impairing the difference in rebound resilience at 70° C. and 23° C.

SUMMARY OF THE INVENTION

It has now been found that the above-mentioned aims are achieved by adding isocyanatosilanes to microgel-containing rubber mixtures.

The invention therefore relates to rubber mixtures containing at least one double bond-containing rubber (A), at least one microgel (B) and at least one isocyanatosilane (C), wherein the double bond-containing rubber (A) content is 100 parts by weight, the rubber gel (B) content is 1 to 150 parts by weight, preferably 10 to 20 parts by weight, and the isocyanatosilane (C) content is 0.2 to 20 parts by weight, preferably 1 to 10 parts by weight, and further rubber auxiliary agents and fillers.

Double bond-containing rubber (A) includes rubbers which are designated R-rubbers in accordance with DIN/ISO 1629. These rubbers have a double bond in the main chain. They include for example:

| | |
|---|---|
| NR: | natural rubber |
| SBR: | styrene/butadiene rubber |
| BR: | polybutadiene rubber |
| NBR: | nitrile butadiene rubber |
| IIR: | butyl rubber |
| HNBR: | hydrogenated nitrile butadiene rubber |
| SNBR: | syrene/butadiene/acrylonitrile rubber |
| CR: | polychloroprene |
| XSBR: | carboxylated styrene/butadiene rubber |
| XNBR: | carboxylated butadiene/acrylonitrile rubber |
| ENR: | epoxydised natural rubber |
| ESBR: | epoxydised styrene/butadiene rubber |

DETAILED DESCRIPTION OF THE INVENTION

Double bond-containing rubbers should, however, also be understood to mean rubbers which are M-rubbers in accordance with DIN/ISO 1629 and, in addition to the saturated main chain, exhibit double bonds in side chains. These include, for example, EPDM.

NR, BR, SBR, SNBR, IIR and EPDM are preferably used.

Crosslinked rubber particles (B), also called rubber gels or microgels, are described, for example, in U.S. Ser. No. 5,124,408, U.S. Ser. No. 5,395,891, DE-A 19 726 729 and in the German patent application 19 701 487.9. Rubbers gels with functional groups with acidic hydrogen which react with alkoxysilanes or with isocyanates are preferred. Preferred functional groups are hydroxyl groups, carboxyl groups, amino groups or amido groups.

BR—, NR—, NBR—, CR— and/or SBR-gels, which are optionally equipped with groups located on the surface of the gels and which are capable of reacting with the isocyanatosilanes, in particular, may be used. Such groups are, for example, the above-mentioned functional groups.

A rubber gel which is hydroxyl-modified may be used particularly advantageously, the acrylates and methacrylates of hydroxyethanol, hydroxypropanol and hydroxybutanol being used for the hydroxyl modification. The quantity of hydroxylation agent is 0.1 to 50 phr based on the unmodified rubber gel. 0.5 to 20 phr are particularly preferred. Hydroxybutylacrylate in quantities of 0.5 to 20 phr is preferably used for the hydroxyl modification.

The microgels have particle diameters of 5 to 1,000 nm, preferably 20 to 600 nm (DVN value to DIN 53206). The diameters $d_{10}$, $d_{50}$ and $d_{80}$ denote characteristic diameters in which 10, 50 and 80 percent by weight of the respective sample have a diameter which is smaller than the corresponding characteristic diameter.

The particles diameters are determined by ultracentrifugation.

Owing to their crosslinking, the rubber gels are insoluble and can be swollen in suitable swelling agents such as toluene. The gel content of the rubber gels is $\geq 80$ wt. %

The swelling indices of the microgels (SI) in toluene are 1 to 50, preferably 1 to 20.

Gel content and swelling index (SI) of the rubber gels are determined by extracting the sample with toluene at ambient temperature. The gel content indicates the percentage by weight of the content which is deposited and can be separated in toluene with centrifugation at 20,000 rpm.

The swelling index is calculated from the weight of the solvent-containing gel (after centrifugation at 20,000 rpm) and the weight of the dry gel:

$$SI = \frac{\text{weight of the sample swollen with toluene (wet weight)}}{\text{weight of the toluene-free sample (dry weight)}}$$

250 mg of gel are allowed to swell in 25 ml of toluene for 24 hours with shaking in order to determine the gel content and swelling index. The gel is centrifuged off and weighed and subsequently dried at 70° C. to constant weight and weighed again.

The glass transition temperature (Tg) of the rubber gels is between −70° C. and +10° C. It is determined by DSC (Differential Scanning Calorimetry) (for example Pyris DSC-7 calorimeter produced by Perkin-Elmer). 11.6+0.3 mg of substance in normal capsules are used to determine Tg. Two heating operations of −100° C. to +150° C. in each case are carried out at a heating rate of 20 K/min and a cooling rate of 320 K/min while purging with nitrogen. The glass transition temperatures are determined during the second DSC heating operation.

The isocyanatosilanes (C) have the following basic structure:

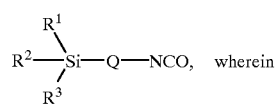

$R^1$, $R^2$ and $R^3$ which may be the same or different represent alkoxy groups with 1 to 12 carbon atoms, preferably 1 to 8 carbon atoms and Q represents a spacer group with structural elements based on aliphatic, heteroaliphatic, aromatic and heteroaromatic carbon chains.

$R^1$, $R^2$ and $R^3$ preferably represent methoxy, ethoxy, propoxy and butoxy groups and Q preferably represents methyl, ethyl, propyl, butyl, pentyl and hexyl groups.

The preferred isocyanatoalkoxysilane is gamma-isocyanatopropyltriethoxysilane of the following formula:

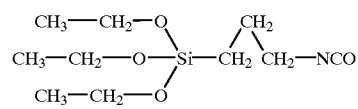

This product is commercially available from Witco, for example, under the name Silquest® A-1310 silanes.

The rubber mixtures according to the invention can also contain further components such as fillers.

Particularly suitable fillers for producing the rubber mixtures and vulcanisates according to the invention are:

carbon blacks. The carbon blacks to be used in this case are produced by the lampblack, furnace or gas black processes and have BET surface areas of 20 to 200 $m^2$g, such as SAF-ISAF-, IISAF-, HAF-, FEF- or GPF-carbon blacks.

highly dispersed silica, produced, for example, by precipitation of silicate solutions or flame hydrolysis of silicon halides with specific surface areas of 5 to 1,000, preferably 20 to 400 $m^2/g$ (BET surface area) and primary particle sizes of 5 to 400 nm. The silicas can optionally also be mixed oxides with other metal oxides, such as Al, Mg, Ca, Ba, Zn and Ti oxides.

synthetic silicates, such as aluminium silicate, alkaline earth silicate, such as magnesium silicate or calcium silicate with BET surface areas of 20 to 400 $m^2/g$ and primary particle diameters of 5 to 400 nm.

natural silicates, such as kaolin and other naturally occurring silicas.

metal oxides, such as zinc oxide, calcium oxide, magnesium oxide, aluminium oxide.

metal carbonates, such as calcium carbonate, magnesium carbonate, zinc carbonate.

metal sulphates, such as calcium sulphate, barium sulphate.

metal hydroxides, such as aluminium hydroxide and magnesium hydroxide.

thermoplastics with high melting point, such as trans-1,4-polybutadiene, syndiotactic 1,2-polybutadiene, polybutylene and polyethylene terephthalate or syndiotactic polystyrene.

thermoplastics with high glass transition temperature, such as polyamides, polyphenylene sulphide or polycarbonates.

rubber gels based on CR, BR, SBR or any other above-described gel particles which have a high degree of crosslinking and particle sizes of 5 to 1,000 nm.

glass fibres and glass fibre products (fibres, strands or glass microbeads).

thermoplastic fibres (polyamide, polyester, aramide).

The above-mentioned fillers can be used alone or in a mixture. The quantity of fillers is normally 5 to 200 parts by weight, based on 100 parts by weight of rubber. In a particularly preferred embodiment of the process, 10 to 100 parts by weight of rubber gel (B) together with 0.1 to 100 parts by weight of carbon black and/or 0.1 to 100 parts by weight of light fillers, in each case based on 100 parts by weight of uncrosslinked rubber, are used. If a mixture of carbon black and light fillers is used the overall quantity is 100 parts by weight maximum.

The rubber mixtures according to the invention can contain additional rubber auxiliary agents, such as crosslinking agents, reaction accelerators, antioxidants, heat stabilisers, light stabilisers, anti-ozonants, processing aids, plasticizers, tackifiers, blowing agents, dyes, pigments, wax, extenders, organic acids, retarders, metal oxides and filler activators, such as triethanolamine, polyethylene glycol, hexanetriol, bis-(triethoxysilylpropyl)-tetrasulphide or other auxiliary agents which are known in the rubber industry.

The above-mentioned rubber auxiliary agents are used in conventional quantities which depend inter alia on the application. Conventional quantities are, for example, quantities of 0.1 to 50 wt. %, based on quantities of rubber (A) used.

Crosslinking agents such as sulphur, sulphur donors, peroxides or crosslinking agents such as diisopropenylbenzene, divinylbenzene, divinylether, divinylsulphone, diallylphthalate, triallylcyanurate, triallylisocyanurate, 1,2-polybutadiene, N,N'-m-phenylene-maleimide and/or triallyltrimellitate can be used as additional auxiliary agents. The acrylates and methacrylates of polyhydric, preferably dihydric to tetrahydric $C_2$ to $C_{10}$ alcohols, such as ethylene glycol, propanediol-1,2-butanediol, hexanediol, polyethylene glycol with 2 to 20, preferably 2 to 8 oxyethylene units, neopentylglycol, bisphenol A, glycerol, trimethylpropane, pentaerythritol, sorbitol with unsaturated polyesters of aliphatic di- and polyols and maleic acid, fumaric acid and/or itaconic acid are also considered. The quantity of crosslinking agent is generally 1 to 30 parts by weight, based on 100 parts by weight of the monomers.

The rubber mixtures according to the invention can also contain vulcanisation accelerators. Examples of suitable vulcanisation accelerators are, for example, mercaptobenzothiazoles, mercaptosulphenamides, guanidines, thiurams, dithiocarbamates, thioureas and thiocarbonates. The vulcanisation accelerators, crosslinking agents or additional crosslinking agents, such as dimeric 2,4-toluylidene-di-isocyanate (=Demodur TT) or 1,4-bis-(2-hydroxyethoxy)benzene (=crosslinking agent 30/10 from Rheinchemie) are used in quantities of approximately 0.1 to 40 percent by weight, preferably 0.1 to 10 percent by weight, based on the total quantity of rubber.

The rubber mixtures according to the invention can be vulcanised at temperatures of 100 to 250° C., preferably 130 to 180° C., optionally under pressure of 10 to 200 bar.

The mixtures according to the invention can be produced in various ways.

On the one hand it is of course possible to mix the solid individual components. Mixing units suitable for this purpose are, for example, rollers, closed mixers or mixing extruders. Mixing by combining the latices of the uncrosslinked or of the crosslinked rubbers is, however, also possible. The mixture according to the invention produced in this way can be isolated in a conventional manner by evaporation, precipitation or freezing coagulation (cf. U.S. Ser. No. 2,187,146). By mixing fillers into the latex mixture and subsequent working up, the mixtures according to the invention can be obtained directly as rubber/filler formulation. Further mixing components are added to the rubber mixture consisting of double bond-containing rubber (A), rubber gel (B) and isocyanatosilane (C), such as additional fillers and optionally rubber auxiliary agents in conventional mixing units, rollers, closed mixers or mixing extruders. The mixing temperatures are approximately 50 to 180° C.

The rubber mixtures according to the invention are suitable for producing vulcanised moulded articles, for example for producing cable sheaths, hoses, driving belts, conveyor belts, roller coverings, shoe soles, ring seals, cushioning elements or diaphragms and for various tire components, such as tire treads, sub-tread mixtures, carcasses or side wall inserts for tires with emergency running properties.

EXAMPLES

Production of the Rubber Gels

TABLE 1

| Gel name | Polymer type | DCP[1] [phr] | HEMA[2] [phr] | HBA[3] [phr] | Gel content [wt. %] | SI[4] | Tg[5] [° C.] | Diameter [nm] | | |
|---|---|---|---|---|---|---|---|---|---|---|
| | | | | | | | | $d_{10}$ | $d_{50}$ | $d_{80}$ |
| Gel 1 | BR | 1.0 | — | — | 96.9 | 7.3 | −68 | 102 | 122 | 136 |
| Gel 2 | SBR | 1.5 | 3 | — | 97 | 5.9 | −19 | 50 | 57 | 61 |
| Gel 3 | BR | 1.5 | 3 | — | 97.3 | 5.9 | −60 | 96 | 119 | 130 |
| Gel 4 | BR | 1.5 | — | 3 | 97.1 | 6 | −62 | 97 | 117 | 126 |

[1] dicumylperoxide
[2] hydroxyethylmethacrylate
[3] hydroxybutylacrylate
[4] swelling index
[5] glass transition temperature Gel 1: Production is as described in U.S. Pat. No. 5,395,891, wherein 1.0 phr (parts per one hundred parts of rubber) are used for crosslinking with dicumylperoxide.

Gel 2: Production is as described in German patent application No. 19919459.9, gel name I, wherein 1.5 phr dicumylperoxide is used for crosslinking (see 1a) "Crosslinking of the rubbers present in latex form"). Grafting with hydroxyethylmethacrylate is as described in 1b) "Grafting of the rubbers present in latex form". Stabilisation and working up of the hydroxyl-modified microgel is as described under item 1c) "Stabilisation and working up of the hydroxyl-modified microgels".

Gel 3: Polymerisation of the BR starting latex is as described in U.S. Pat. No. 5,395,891. Crosslinking with DCP, grafting with HEMA and working up are described in the above-mentioned German application.

Gel 4: Gel 4 is produced in a similar way to Gel 3, hydroxybutylacrylate (HBA) being used for the hydroxyl modification instead of hydroxyethylmethacrylate (HEMA).

Compound Production, Vulcanisation and Properties of the Vulcanisates

The effect according to the invention in an unmodified BR gel (Gel 1) and in a HEMA-modified SBR rubber gel (Gel 2) is demonstrated in the first mixing run:

For this purpose, the mixing components are mixed on the roller in the specified sequence and in accordance with the following formulations:

TABLE 2

| Mixture No. | 1 | 2 | 3 | 4 | 5 |
|---|---|---|---|---|---|
| Natural rubber[1] | 100 | 100 | 100 | 100 | 100 |
| Gel 1 | 60 | 60 | | | |
| Gel 2 | | | 30 | 30 | 30 |
| Stearic acid | 3 | 3 | 3 | 3 | 3 |
| Zinc oxide | 3 | 3 | 3 | 3 | 3 |
| Light/ozone protection wax[2] | 1.5 | 1.5 | 1.5 | 1.5 | 1.5 |
| N-isopropyl-N'-phenyl-p-penylene-diamine[3] | 1 | 1 | 1 | 1 | 1 |
| 2,2,4-trimethyl-1,2-dihydro-quinoline[4] | 1 | 1 | 1 | 1 | 1 |
| Naphthenic processing oil[5] | 3 | 3 | 3 | 3 | 3 |
| Sulphur | 1.6 | 1.6 | 1.6 | 1.6 | 1.6 |

[1]TSR 5, Defo 700
[2]Antilux ® 654 from Rheinchemie
[3]Vulcanox ® 4010 NA from Bayer AG
[4]Vulcanox ® HS from Bayer AG
[5]Enerthene ® 1849-1 from BP After cooling the mixtures to ambient temperature (storage at ambient temperature for 1 day) Vulcacit® NZ and Silquest® A-1310 silanes are added to the roller.

TABLE 3

| Mixture No. | 1 | 2 | 3 | 4 | 5 |
|---|---|---|---|---|---|
| N-tert.butyl-2-benzothiazylsulphenamide[6] | 2 | 2 | 2 | 2 | 2 |
| Gamma-isocyanatopropyltriethoxysilane[7] | 0 | 5 | 0 | 5 | 10 |

[6]Vulcacit ® NZ from Bayer AG
[7]Silquest ® A-1310 silanes from Whitco

The vulcanisation behaviour of the mixtures is investigated in the Rheometer at 160° C. to DIN 53 529. In this way characteristic data such as $F_a$, $F_{max}$, $F_{max.}-F_{a.}$, $t_{10}$, $t_{80}$ and $t_{90}$ is determined:

TABLE 4

| Mixture No. | 1 | 2 | 3 | 4 | 5 |
|---|---|---|---|---|---|
| $F_a$ [dNM] | 0.80 | 1.13 | 0.38 | 0.32 | 0.32 |
| $F_{max}-F_a$ [dNM] | 12.32 | 15.98 | 10.42 | 13.69 | 16.2 |
| $F_{min}$ [dNM] | 0.80 | 1.13 | 0.38 | 0.32 | 0.32 |
| $F_{max-Fmin}$ [dNM] | 12.32 | 15.98 | 10.42 | 13.69 | 16.2 |
| $t_{10}$ [min.] | 5.77 | 2.37 | 4.48 | 3.14 | 2.57 |

TABLE 4-continued

| Mixture No. | 1 | 2 | 3 | 4 | 5 |
|---|---|---|---|---|---|
| $t_{80}$ [min.] | 8.21 | 8.40 | 6.74 | 6.2 | 5.88 |
| $t_{90}$ [min.] | 9.88 | 10.18 | 8.58 | 7.97 | 8.48 |

In accordance with DIN 53 529, Part 3:
$F_a$: is the minimum cure meter display of the crosslinking isotherms
$F_{max}$: is the maximum cure meter display
$t_{10}$: is the time at which 10% of the conversion is achieved
$t_{80}$: is the time at which 80% of the conversion is achieved
$t_{90}$: is the time at which 90% of the conversion is achieved.

The mixtures are vulcanised in the press at 160° C.

TABLE 5

| Mixture No. | 1 | 2 | 3 | 4 | 5 |
|---|---|---|---|---|---|
| Vulcanisation time [min] | 20 | 20 | 20 | 20 | 20 |

The following test results were obtained on the basis of the above-mentioned compounds:

TABLE 6

| Mixture No. | 1 | 2 | 3 | 4 | 5 |
|---|---|---|---|---|---|
| Tensile strength [MPa] | 16.9 | 14.7 | 27.3 | 27.4 | 24.5 |
| Elongation at break (D) [%] | 475 | 370 | 605 | 560 | 495 |
| Modulus/50% elongation [MPa] | 0.9 | 1.3 | 1.0 | 1.8 | 2.1 |
| Modulus/100% elongation [MPa] | 1.5 | 2.4 | 1.5 | 2.8 | 3.5 |
| Modulus/200% elongation [MPa] | 3.4 | 4.9 | 2.7 | 4.9 | 6.1 |
| Modulus at 300% elongation ($S_{300}$) [MPa] | 7.3 | 9.8 | 4.9 | 8.0 | 9.8 |
| Shore A hardness, 23° C. | 55 | 61 | 54 | 60 | 61 |
| Shore A hardness, 70° C. | 52 | 60 | 50 | 57 | 58 |
| Rebound resilience, 23° C. [%] | 54 | 58 | 46 | 47 | 47 |
| Rebound resilience, 70° C. [%] | 67 | 71 | 67 | 68 | 68 |
| Abrasion/60 DIN 53516 [mm3] | 201 | 173 | 160 | 103 | 161 |
| Goodrich-Flexometer (100° C.); heating [° C.] | 7.9 | 6.0 | | | |
| tan δ | 0.079 | 0.095 | | | |
| $S_{300} \times D$ | 3468 | 3626 | 2965 | 4480 | 4851 |

Result: It is shown in the first mixing run that an improvement in the mechanical properties ($S_{300} \times D$) is achieved owing to the use of γ-isocyanatopropyltriethoxysilane both in a non-hydroxyl-modified BR gel (Gel 1) and in a hydroxyl-modified SBR gel (Gel 2).

The effect according to the invention in two hydroxyl group-containing BR rubber gels is demonstrated in the second mixing run, Gel 3 being modified with HEMA and Gel 4 with HBA.

For this purpose, the mixing components are mixed on the roller in the specified sequence and in accordance with the following formulations:

TABLE 8

| Mixture No. | 1 | 2 | 3 | 4 | 5 |
|---|---|---|---|---|---|
| Natural rubber[1] | 100 | 100 | 100 | 100 | 100 |
| Gel 3 | 60 | 60 | | | |
| Gel 4 | | | 60 | 60 | 60 |
| Stearic acid | 3 | 3 | 3 | 3 | 3 |
| Zinc oxide | 3 | 3 | 3 | 3 | 3 |
| Light/ozone protection was[2] | 1.5 | 1.5 | 1.5 | 1.5 | 1.5 |
| N-isopropyl-N'-phenyl-p-phenylene-diamine[3] | 1 | 1 | 1 | 1 | 1 |
| 2,2,4-trimethyl-1,2-dihydro- | 1 | 1 | 1 | 1 | 1 |

TABLE 8-continued

| Mixture No. | 1 | 2 | 3 | 4 | 5 |
|---|---|---|---|---|---|
| quinoline[4] | | | | | |
| Naphthenic processing oil[5] | 3 | 3 | 3 | 3 | 3 |
| Sulphur | 1.6 | 1.6 | 1.6 | 1.6 | 1.6 |

[1] TSR 5, Defo 700
[2] Antilux ® 654 from Rheinchemie
[3] Vulkanox ® 4010 NA from Bayer AG
[4] Vulkanox ® HS from Bayer AG
[5] Enerthene ® 1849-1 from BP After cooling the mixtures to ambient temperature (storage for 1 day at ambient temperature) Vulkacit® NZ and Silquest® A-1310 silanes were added to the roller.

TABLE 9

| Mixture No. | 1 | 2 | 3 | 4 | 5 |
|---|---|---|---|---|---|
| N-tert.butyl-2-benzothiazylsulphenamide[6] | 2 | 2 | 2 | 2 | 2 |
| Gamma-isocyanatopropyltriethoxysilane[7] | 0 | 5 | 0 | 3 | 5 |

[6] Vulkacit ® NZ from Bayer AG
[7] Silquest ® A-1310 silanes from Witco

The vulcanisation behaviour of the mixtures is investigated in the Rheometer at 160° C. Characteristic data such as $F_{min}$, $F_{max.}-F_{min.}$, $t_{10}$, $t_{80}$ and $t_{90}$ is determined in this way:

TABLE 10

| Mixture No. | 1 | 2 | 3 | 4 | 5 |
|---|---|---|---|---|---|
| $F_{min}$ [dNM] | 0.80 | 1.13 | 0.90 | 0.67 | 0.98 |
| $F_{max-Fmin}$ [dNM] | 12.32 | 15.98 | 12.28 | 14.53 | 15.08 |
| $t_{10}$ [min.] | 5.77 | 2.37 | 5.82 | 3.57 | 3.15 |
| $t_{80}$ [min.] | 8.21 | 8.40 | 8.09 | 7.93 | 7.27 |
| $t_{90}$ [min.] | 9.88 | 10.18 | 9.63 | 9.53 | 7.91 |

The mixtures are vulcanised in the press at 160° C.

TABLE 11

| Mixture No. | 1 | 2 | 3 | 4 | 5 |
|---|---|---|---|---|---|
| Vulcanisation time [min] | 20 | 20 | 20 | 20 | 20 |

The following test results are obtained on the basis of the above-mentioned compounds:

The improvement in the mechanical properties ($S_{300} \times D$) owing to the use of γ-isocyanatopropyltriethoxysilane with two hydroxyl group-containing BR rubber gels is demonstrated in the second mixing run, greater effects being achieved with the hydroxybutylacrylate-(HBA)-modified BR Gel 4 than with the hydroxyethylmethacrylate-(HEMA)-modified BR Gel 3.

What is claimed is:

1. Rubber mixtures comprising at least one double bond-containing rubber(s) (A), at least one rubber gel (B) which has been modified with hydroxybutyl acrylate and at least one isocyanatosilane (C), and optionally rubber auxiliary agents and fillers, wherein the double bond-containing rubber(s) (A) content is 100 parts by weight, the gel (B) content is 1 to 150 parts by weight, and the isocyanatosilane (C) content is 3 to 10 parts by weight and wherein the hydroxybutyl acrylate is in the quantity of 0.1 to 50 phr based on the unmodified rubber gel.

2. Rubber mixtures according to claim 1, wherein the double bond-containing rubber(s) (A) is selected from the group consisting of natural rubber (NR), polybutadiene rubber (BR), styrene-butadiene rubber (SBR), styrene-butadiene-acrylonitrile rubber (SNBR), butyl rubber (IIR), and ethylene-propylene-diene rubber (EPDM).

3. Rubber mixtures according to claim 1, wherein the rubber gel is selected from the group consisting of polybutadiene rubber gels, natural rubber gels, nitrile-butadiene rubber gels, polychloroprene rubber gels and styrene-butadiene rubber gels.

4. Rubber mixtures according to claim 1, wherein the isocyanatosilane is δ-isocyanatopropyltriethoxysilane.

5. Rubber mixtures comprising at least one double bond-containing rubber(s) (A), at least one rubber gel (B) which has been modified with an hydroxylation agent and at least one isocyanatosilane (C) and optionally rubber auxiliary agents and fillers, wherein the double bond-containing rubber(s) (A) content is 100 parts by weight, the gel (B) content is 1 to 150 parts by weight, and the isocyanatosilane (C) content is 3 to 10 parts by weight, and wherein the hydroxylation agent is in the quantity of 0.1 to 50 phr based on the unmodified rubber gel and wherein the rubber gel is selected from the group consisting of polybutadiene rubber gels, natural rubber gels, nitrile-butadiene rubber gels and polychloroprene rubber gels.

6. Rubber mixtures according to claim 5, wherein the double bond-containing rubber(s) (A) is selected from the

TABLE 12

| Mixture No. | 1 | 2 | 3 | 4 | 5 |
|---|---|---|---|---|---|
| Tensile strength [MPa] | 16.9 | 14.7 | 20.0 | 21.0 | 18.9 |
| Elongation at break (D) [%] | 475 | 370 | 510 | 510 | 465 |
| Modulus/50% elongation [MPa] | 0.9 | 1.3 | 0.9 | 1.2 | 1.2 |
| Modulus/100% elongation [MPa] | 1.5 | 2.4 | 1.5 | 2.1 | 2.2 |
| Modulus/200% elongation [MPa] | 3.4 | 4.9 | 3.6 | 4.2 | 4.4 |
| Modulus at 300% elongation ($S_{300}$) [MPa] | 7.3 | 9.8 | 7.7 | 8.4 | 8.8 |
| Shore A hardness, 23° C. | 55 | 61 | 54 | 58 | 59 |
| Shore A hardness, 70° C. | 52 | 60 | 53 | 57 | 58 |
| Rebound resilience, 23° C. [%] | 54 | 58 | 54 | 56 | 57 |
| Rebound resilience, 70° C. [%] | 67 | 71 | 67 | 69 | 71 |
| Abrasion/60 DIN 53516 [mm3] | 201 | 173 | 192 | 166 | 179 |
| Goodrich-Flexometer (100° C.); heating [° C.] | 7.9 | 6.0 | 7.5 | 7.5 | 5.3 |
| tan | 0.079 | 0.095 | 0.083 | 0.094 | 0.088 |
| $S_{300} \times D$ | 3468 | 3626 | 3927 | 4284 | 4092 | group consisting of natural rubber (NR), polybutadiene rubber (BR), styrene-butadiene rubber (SBR), styrene-butadiene-acrylonitrile rubber (SNBR), butyl rubber (IIR), and ethylene-propylene-diene rubber (EPDM).

7. Rubber mixtures according to claim 5, wherein the hydroxybutyl acrylate.

8. Rubber mixtures according to claim 5, wherein the isocyanatosilane is δ-isocyanatopropyltriethoxysilane.

* * * * *